United States Patent Office 2,752,348
Patented June 26, 1956

2,752,348

VITAMIN B₁ DERIVATIVES AND THE PREPARATION THEREOF

Taizo Matsukawa and Hajime Kawasaki, Osaka, Japan, assignors to Takeda Pharmaceutical Industries, Ltd., Osaka, Japan No Drawing. Application January 10, 1955,
Serial No. 481,013

Claims priority, application Japan June 14, 1952

8 Claims. (Cl. 260—256.5)

This invention relates to new vitamin $B_1$ derivatives having the general formula

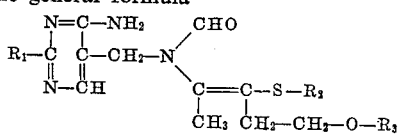

wherein $R_1$ represents methyl or ethyl, $R_2$ an acyl group and $R_3$ hydrogen or an acyl group, and to the physiologically tolerable, i. e. non-toxic, salts thereof.

The following table summarizes the properties of illustrative compounds of the said formula:

$B_1$ activity in the living body without being affected by the vitamin $B_1$ decomposition factors.

ANIMAL TEST

*1. Preventive effect on vitamin $B_1$ avitaminosis of rice birds*

The derivative $R_1=CH_3$, $R_2=CH_3CO—$, $R_3=CH_3CO—$ (referred to as D. A. T.), the derivative $R_1=CH_3$, $R_2=C_6H_5CO—$, $R_3=C_6H_5CO—$ (referred to as D. B. T.) and vitamin $B_1$ were administered per os to rice birds, and the changes of the body weight and survival time were recorded.

As is seen from Tables I and II the two derivatives have the same preventive effect as vitamin $B_1$.

TABLE I

[0.02 mMol. each of vitamin $B_1$ hydrochloride and D. A. T. was administered.]

| | Body weight before test, g. | Body weight 2 days after test | 4th day | 6th day | 8th day | 10th day | 12th day | 14th day |
|---|---|---|---|---|---|---|---|---|
| D. A. T. | 14 | 13.7 | 14.2 | 14.0 | 13.9 | 14.0 | 14.1 | 14.1 survived. |
| V. B₁.HCl | 14 | 13.8 | 13.9 | 13.9 | 13.7 | 13.5 | 13.6 | 12.9 survived. |
| Control [1] | 14 | 13.8 | 13.9 | 13.3 | 11.6 | 11.2 | died | |

[1] See footnote, table II.

TABLE II

| | Body weight before test, g. | Body weight 2 days after test | 4th day | 6th day | 8th day | 10th day | 12th day | 14th day |
|---|---|---|---|---|---|---|---|---|
| D. B. T. (0.02 mMol.) | 13.5 | 13.4 | 13.3 | 13.1 | 12.5 | 12.3 | 12.4 | 11.9 survived. |
| D. B. T. (0.06 mMol.) | 13.3 | 13.2 | 13.1 | 13.1 | 13.2 | 12.8 | 12.8 | 12.6 survived. |
| V. B₁.HCl (0.02 mMol.) | 13.3 | 13.7 | 13.5 | 13.4 | 13.5 | 13.3 | 13.1 | 12.8 survived. |
| Control [1] | 13.7 | 13.8 | 13.2 | 12.7 | 10.4 | 9.5 | died | |

[1] The control animals in Tables I and II were given food deficient in vitamin $B_1$.

Some other derivatives, for example those having $R_1=CH_3$, $R_2=CH_3CO$, $R_3=C_6H_5CO$ or $R_1=CH_3$, $R_2=C_2H_5CO$, $R_3=C_6H_5CO$, were tested with the same result.

*2. Curative effect on vitamin $B_1$ avitaminosis of pigeons and rice birds*

(1) Twenty $\gamma$ of D. A. T. was injected into breast muscle of each of three rice birds, and a small quantity of D. B. T. was administered per os to each of other three rice birds, all suffering from severe vitamin $B_1$

| Derivatives | | | M. P. (with decomp.) | Solvent for recrystallization | Crystal form |
|---|---|---|---|---|---|
| $R_1$ | $R_2$ | $R_3$ | | | |
| $CH_3—$ | $CH_3CO—$ | $CH_3CO—$ | 122–123° C | A mixture of benzene and benzine | Colorless prisms. |
| $CH_3—$ | $C_6H_5CO—$ | $C_6H_5CO—$ | 173–174° C | Dilute alcohol | Do. |
| $CH_3—$ | $p-NO_2C_6H_4CO—$ | H | 135° C | Water | Do. |
| $CH_3—$ | $CH_3CO—$ | $C_6H_5CO—$ | 141–142° C | A mixture of benzene and benzine | Do. |
| $CH_3—$ | $C_2H_5CO—$ | $C_6H_5CO—$ | 134–135° C | do | Do. |
| $CH_3—$ | $C_3H_7CO—$ | $C_6H_5CO—$ | 107–108° C | do | Do. |
| $CH_3—$ | $p-NO_2C_6H_4CO—$ | $C_6H_5CO—$ | 169–170° C | Alcohol | Do. |
| $CH_3—$ | $C_6H_5CO—$ | $C_2H_5CO—$ | 104–105° C | Ether | Do. |
| $CH_3—$ | $C_3H_7CO—$ | $C_6H_5CO—$ | 69–70° C | A mixture of benzene and benzine | Do. |
| $CH_3—$ | $C_3H_7CO—$ | H | 129–130° C | Benzene | Do. |
| $CH_3—$ | $C_2H_5O.CO—$ | $C_6H_5CO—$ | 141–142° C | Dilute methanol | Do. |
| $C_2H_5—$ | $CH_3CO—$ | $CH_3CO—$ | 113–114° C | A mixture of benzene and benzine | Do. |
| $C_2H_5—$ | $C_6H_5CO—$ | $C_6H_5CO—$ | 171–173° C. (hydrochloride) | A mixture of alcohol and ether | Do. |
| $CH_3—$ | $CH_3CO—$ | $C_6H_5CO—$ | 210–211° C. (perchloric acid salt) | Dilute alcohol | Do. |
| $CH_3—$ | $C_6H_5CO—$ | $C_6H_5CO—$ | 165° C. (nitric acid salt) | Water | Do. |
| $CH_3—$ | $C_6H_5CO—$ | $C_6H_5CO—$ | 78–80° C. (hydrobromide) | do | Colorless needles. |
| $CH_3—$ | $C_6H_5CO—$ | $C_6H_5CO—$ | 83–85° C. (sulfuric acid salt) | do | Do. |

These derivatives are thought to be absorbed from the intestinal canal to liberate vitamin $B_1$ and display vitamin avitaminosis. In all cases the symptom was alleviated appreciably after one hour except one case.

(2) Curative daily dose of vitamin $B_1$ hydrochloride and D. A. T. was tested on the typical polyneuritis of pigeons. In all cases the symptom was alleviated within several hours.

From the above results it is evident that D. A. T. has the same curative effect as vitamin $B_1$.

3. Test of toxicity

The toxicity of D. A. T. was tested according to the Behrens-Körber method, using mice as test animals. $LD_{50}$ of D. A. T. administered by intravenous injection was 0.0104 mMol/10 g. and that of vitamin $B_1$ hydrochloride was 0.00207 mMol/10 g. That is, the toxicity of the former is one fifth of that of the latter.

4. Test of excretion in urine after large dose administration

Thirty mg. of vitamin $B_1$ hydrochloride, 32.6 mg. of D. A. T. and 43 mg. of D. B. T. (the amounts of the latter two are equivalent to 30 mg. of vitamin $B_1$ hydrochloride, respectively) were administered separately to seven healthy humans (male and female). The urine was collected 3 hours after administration, and the vitamin $B_1$ in the urine was determined quantitatively. The results are shown in Table III.

TABLE III

|  | Amount of vitamin $B_1$ excreted within 3 hours |
|---|---|
| Vitamin $B_1$.HCl | 0.47±0.16 mg. |
| D. A. T | 2.58±0.89 mg. |
| D. B. T | 1.80±0.98 mg. |

As is evident from the table D. A. T. is excreted in the largest quantity and it is clear that D. A. T. and D. B. T. are absorbed more readily than vitamin $B_1$.

The preparation of the new derivatives of vitamin $B_1$ is described in the following:

In solution vitamin $B_1$ and its derivatives exist in a state of equilibrium between ammonium-type and thiol-type, and this equilibrium shifts to the ammonium-type in an acid medium and to the thiol-type in an alkaline medium. Since the compounds of the present invention are derivatives of the thiol-type vitamin $B_1$, the object of the present invention is attained profitably by acylating vitamin $B_1$ or its derivatives at a pH above 7. The reaction can be conducted in a medium of a pH higher than 10, so long as the material is not decomposed in this state. In general the solution of vitamin $B_1$ or its derivatives in a strong alkaline medium is stable at room temperature. On the other hand, the yield of the reaction effected in a medium of a pH below 7 is poor, because the thiol-type of vitamin $B_1$ or its derivatives exists in small quantity in this state.

The reaction of the present invention is represented by the following equation:

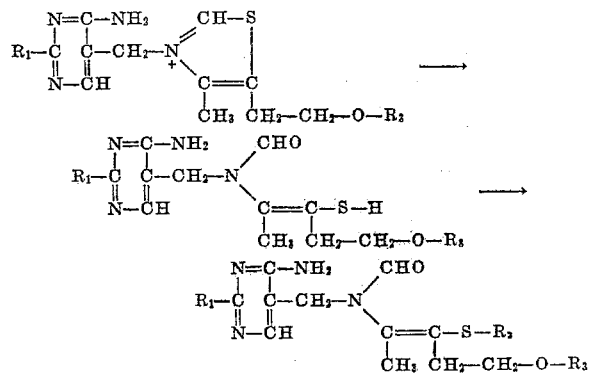

wherein $R_1$ is a methyl or ethyl group, $R_2$ an acyl group and $R_3$ hydrogen or an acyl group.

In this reaction acid anhydrides, acid halides or other acylating agents are employed as acylating agent. Illustrative of the acyl group to be introduced are, for example, acetyl, propionyl, butyryl, benzoyl, p-nitrobenzoyl, carbalkoxyl and other aliphatic and aromatic acyl groups with or without substituent.

The reaction is carried out advantageously in water, alcohol, methanol, pyridine or other suitable solvent, so long as the latter does not affect the reaction.

Depending on the acylating agent, the acyl group is introduced only in the sulfhydryl group (—SH) or in both the sulfhydryl and hydroxyl group of the hydroxyethyl group. That is, the acyl group is generally introduced first into the sulfhydryl group, then into the hydroxyl group, but if the S-acyl compound is sparingly soluble in the solvent its further acylation stops. These compounds react with inorganic or organic acids to yield their salts. To take hydrochloride as an example, thiol-type vitamin $B_1$ diacetyl, dibenzoyl and dipropionyl derivatives give their hydrochlorides in colorless prisms melting at 119–120° C. (decomp.), 160° C. (decomp.) and 188–189° C. (decomp.), respectively.

These hydrochlorides are more stable to heat than their free bases. For instance, when a solution in water of thiol-type vitamin $B_1$ diacetyl derivative hydrochloride and that of its free base are heated at 100° C. for 30 minutes, subjected separately to partition chromatography and sprayed with the Dragendorff reagent, the latter reveals decomposition products while the former does not. All of the products have the same activity as vitamin $B_1$, are not decomposed by the vitamin $B_1$ decomposition factors and are absorbed effectively from the intestinal canal when administered per os.

The said compounds also form other therapeutically applicable, i. e. non-toxic, acid salts, as for example other hydrohalides than the hydrochloride, e. g. the hydrobromide, hydroiodide, etc., and the sulfate, nitrate, phosphate, perchlorate, thiocyanate, acetate, propionate, oxalate, malate, succinate, tartrate, citrate, benzoate, methane-sulfonate, ethane-sulfonate, benzene-sulfonate, toluene-sulfonate, etc.

Representative illustrative embodiments of the invention are set forth in the following examples. In these examples, the parts and percentages are by weight.

*Example 1.*—To a solution of 2 parts of vitamin $B_1$ hydrochloride in 5 parts of water, there are added 7 parts of an aqueous sodium hydroxide solution of 10% strength followed dropwise by 1.5 parts of acetic anhydride with stirring. During the reaction which ensues, the mixture is kept alkaline by the occasional addition of aqueous sodium hydroxide solution. Sodium chloride is then added to the reaction mixture to salt out the product, which is recrystallized from a mixture of benzene and petroleum benzine, in the form of colorless prisms melting at 122–123° C., with decomposition. The yield is 1.7 parts. The product, which is readily soluble in water, alcohol, acetone and ethyl acetate, fairly soluble in ether and benzene, and sparingly soluble in petroleum benzine, has a structure represented by the formula

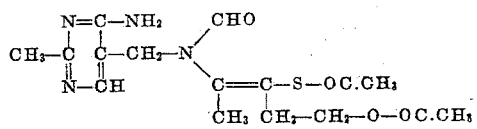

The product forms a hydrochloride which melts at 119–120° C. (with decomposition).

*Example 2.*—To a solution of 1 part of vitamin $B_1$ hydrochloride in 3 parts of water there are added 3.5 parts of aqueous sodium hydroxide solution of 10% strength followed dropwise by 0.7 part of benzoylchloride with stirring. During the reaction which ensues, the mixture is kept alkaline by the occasional addition of sodium hydroxide solution. The product which separates out is recrystallized, from dilute alcohol, in the form of colorless prisms melting at 173–174° C. with decomposition. The yield is 0.8 part. The product which is readily soluble in alcohol and acetone and sparingly soluble in water, has a structure represented by the formula

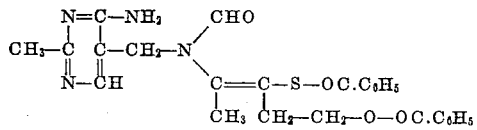

*Example 3.*—To a solution of 2 parts of vitamin B₁ hydrochloride in 5 parts of water, there are added 7 parts of aqueous sodium hydroxide solution of 10% strength, followed dropwise by a solution of 1.2 parts of p-nitrobenzoylchloride in 2 parts of ethyl acetate with stirring. During the reaction which ensues, the mixture is kept alkaline by the occasional addition of aqueous sodium hydroxide solution. The product is filtered, dissolved in dilute hydrochloric acid, and the solution neutralized by sodium bicarbonate to precipitate the product in the form of colorless prisms melting at 135° C. with decomposition. The yield is 2 parts. The product which is sparingly soluble in water and organic solvents has a structure represented by the formula

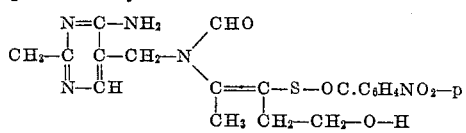

*Example 4.*—To a solution of 3 parts of benzoyl vitamin B₁ hydrobromide in 20 parts of water, there are added 7 parts of an aqueous sodium hydroxide solution of 10% strength, followed dropwise by 1 part of acetic anhydride with stirring, whereupon an oily product separates which solidifies immediately. During the reaction the mixture is kept alkaline by the occasional addition of aqueous sodium hydroxide solution. The product is recrystallized, from a mixture of benzene and petroleum benzine, in the form of colorless prisms melting at 141–142° C. with decomposition. The yield is 1.7 parts. The product has a structure represented by the formula

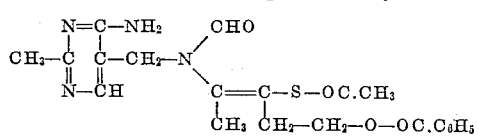

*Example 5.*—To a solution of 6 parts of benzoyl vitamin B₁ hydrobromide in 50 parts of water, there are added 14 parts of aqueous sodium hydroxide solution of 10% strength, followed dropwise by 1.6 parts of propionic anhydride with stirring, whereupon an oily product separates which solidifies immediately. During the reaction the mixture is kept alkaline by the occasional addition of sodium hydroxide solution. The product is recrystallized, from a mixture of benzene and petroleum benzine, in the form of colorless prisms melting at 134–135° C. with decomposition. The yield is 4 parts. The product has a structure represented by the formula

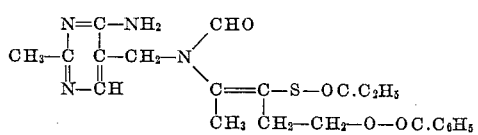

*Example 6.*—To a solution of 2.5 parts of benzoyl vitamin B₁ hydrobromide in 10 parts of water, there are added 7 parts of aqueous sodium hydroxide solution of 10% strength followed dropwise by 1 part of butyric anhydride with stirring, whereupon an oily product separates which solidifies immediately. During the reaction the mixture is kept alkaline by the occasional addition of sodium hydroxide solution. The product is recrystallized, from a mixture of benzene and petroleum benzine, in the form of colorless prisms, melting at 107–108° C. with decomposition. The yield is 1.5 parts. The product has a structure represented by the formula

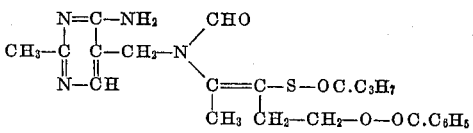

*Example 7.*—To a solution of 3 parts of benzoyl vitamin B₁ hydrobromide in 10 parts of water, there are added 7 parts of an aqueous sodium hydroxide solution of 10% strength followed dropwise by 1 part of benzoyl chloride with stirring whereupon an oily product separates which solidifies immediately. During the reaction, the mixture is kept alkaline by the occasional addition of aqueous sodium hydroxide solution. The product is recrystallized, from dilute alcohol, in the form of colorless prisms melting at 173–174° C. with decomposition. The yield is 2.2 grams. The product has a structure represented by the formula

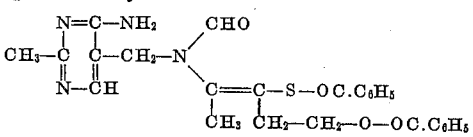

The product forms a hydrochloride which melts at 160° C. with decomposition.

*Example 8.*—To a solution of 3 parts of benzoyl vitamin B₁ hydrobromide in 30 parts of water, there are added 7 parts of aqueous sodium hydroxide solution of 10% strength followed dropwise by a solution of 1.2 parts of p-nitrobenzoyl chloride in 10 parts of ethyl acetate. During the reaction which ensues, the mixture is kept alkaline by the occasional addition of aqueous sodium hydroxide solution. The product which separates is recrystallized from alcohol in the form of colorless prisms melting at 169–170° C. with decomposition. The yield is 2.3 parts. The product has a structure represented by the formula

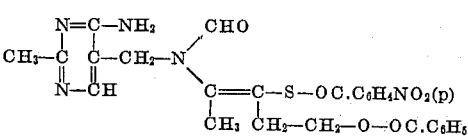

*Example 9.*—To a solution of 2 parts of vitamin B₁ hydrochloride in 10 parts of water, there are added 7 parts of an aqueous sodium hydroxide solution of 10% strength. To the resultant solution, after saturation thereof with sodium chloride, there are added dropwise, while stirring, 2 parts of propionic anhydride, whereupon an oily product separates which solidifies gradually. During the reaction, the mixture is kept alkaline by the occasional addition of aqueous sodium hydroxide solution. The product is recrystallized from ether in the form of colorless prisms, melting at 104–105° C. with decomposition. The yield is 1.7 parts. The product has a structure represented by the formula

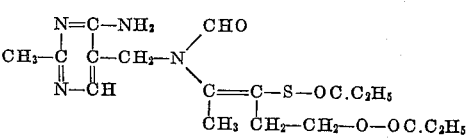

The product forms a hydrochloride which melts at 188–189° C. with decomposition.

*Example 10.*—To a solution of 3 parts of benzoyl vitamin B₁ hydrobromide in 15 parts of water, there is added a solution of 0.8 part of sodium hydroxide in 5 parts of water. After the resultant solution has been allowed to stand for an hour there is added thereto portionwise 0.7 part of ethyl chlorocarbonate while cooling with ice and stirring vigorously, whereupon a viscous oil separates which is crystallized by triturating with 100 parts of ether. The product is recrystallized from dilute methanol, in the form of colorless prisms, melting at 141–142° C. The yield is 2 parts. The product has a structure represented by the formula

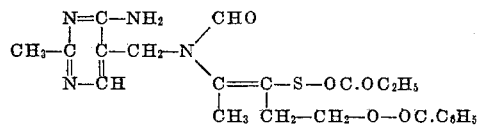

*Example 11.*—To a solution of 2 parts of vitamin B₁ hydrochloride in 10 parts of water, there are added 7 parts of aqueous sodium hydroxide solution of 10% strength followed dropwise by 2 parts of butyric anhydride while stirring, whereupon an oil product separates which solidifies gradually. During the reaction, the mixture is kept alkaline by the occasional addition of aqueous sodium hydroxide solution. The product is recrystallized from a mixture of benzene and benzine in the form of prisms melting at 69–70° C. The yield is 1.5 parts. The product has a structure represented by the formula

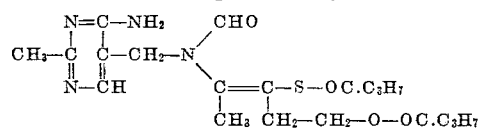

*Example 12.*—To a solution of 1 part of the hydrochloride of homovitamin B₁ (a compound having the same structure as vitamin B₁ except that the methyl group at C₂ of the pyrimidine nucleus is replaced by an ethyl group) in 7 parts of water, there are added 3.5 parts of aqueous sodium hydroxide solution of 10% strength. To the resultant solution, after saturation thereof with sodium chloride, there is added, dropwise, and while stirring 1 part of acetic anhydride, whereupon an oily product separates which solidifies gradually. During the reaction, the mixture is kept alkaline by the occasional addition of sodium hydroxide solution. The product is recrystallized, from a mixture of benzene and petroleum benzine, in the form of colorless prisms melting at 113–114° C. with decomposition. The yield is 0.8 part. The product has a structure represented by the formula

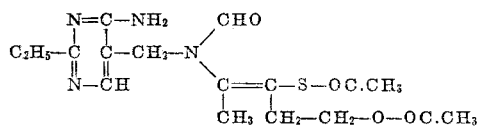

*Example 13.*—To a solution of 1 part of homovitamin B₁ hydrochloride in 15 parts of water, there are added 3.5 parts of aqueous sodium hydroxide solution of 10% strength, followed dropwise and while stirring by 1 part of benzoyl chloride, whereupon an oily product separates. During the reaction, the mixture is kept alkaline by the occasional addition of aqueous sodium hydroxide solution. The product is dissolved in ethyl acetate, and the solution is dried with anhydrous sodium sulfate and then evaporated to dryness in vacuo. The residue is dissolved in a small quantity of absolute alcohol, after which there is added alcohol containing hydrochloric acid and then a large quantity of ether to separate crystals of the hydrochloride. The product is recrystallized from a mixture of alcohol and ether, in the form of colorless prisms melting at 171–173° C. with decomposition. The yield is 0.8 part. The product has a structure represented by the formula

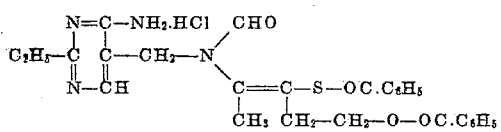

*Example 14.*—Dilute perchloric acid is added to the product of Example 4, whereupon a syrupy mixture is formed which soon solidifies. The resultant perchloric acid salt is purified by recrystallization from dilute alcohol, whereupon it has a melting point of 210–211° C., with decomposition. The salt corresponds to the formula

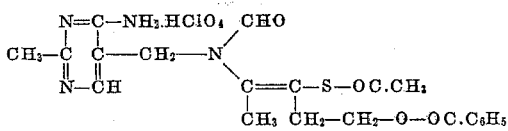

*Example 15.*—Dilute nitric acid is added to the base obtained according to Example 7, whereupon there is obtained a syrupy product which soon solidifies. The thus-obtained nitrate is recrystallized from water whereupon it melts at 165° C. with decomposition. The nitrate corresponds to the formula

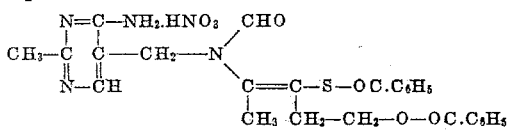

*Example 16.*—Upon the addition of dilute hydrobromic acid to the base obtained according to Example 7, there is obtained a syrupy product which soon solidifies. The so-obtained hydrobromide is purified by recrystallization from water, and melts at 78–80° C. This product has two mols of water crystallization; it corresponds to the formula

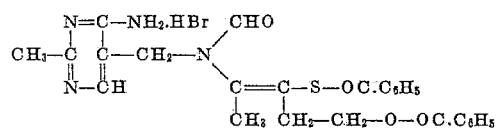

*Example 17.*—Dilute sulfuric acid is added to the base obtained according to Example 7, whereupon a syrupy product is obtained which soon solidifies. The resultant sulfate is purified by recrystallization from water, whereupon it melts at 83–85° C. The product has two mols of water of crystallization; it corresponds to the formula

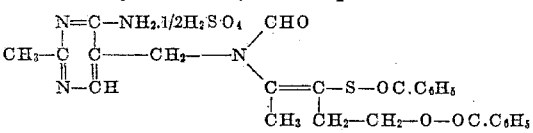

*Example 18.*—To a solution of 2 parts of vitamin B₁ hydrochloride in 10 parts of water, there are added 7 parts of an aqueous sodium hydroxide solution of 10% strength. To the resultant solution, after saturation thereof with sodium chloride, there is added dropwise, while stirring, 1 part of butyric anhydride, whereupon an oily product separates. During the reaction, the mixture is kept alkaline by the occasional addition of aqueous sodium hydroxide solution. The product is dissolved in ethyl acetate and the solution is dried in vacuo. The residue is recrystallized from benzene in the form of colorless prisms melting at 129–130° C. with decomposition. The yield is 1.2 parts. The product has a structure represented by the formula

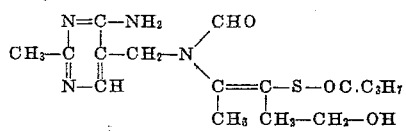

This application is in part a continuation of copending application Serial No. 358,965, filed June 1, 1953.

Having thus disclosed the invention, what is claimed is:

1. A member selected from the group consisting of compounds having the general formula

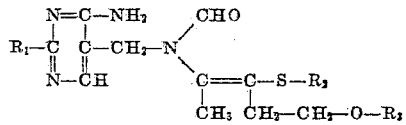

and their therapeutically useful acid salts, wherein R₁ is a member selected from the group consisting of methyl and ethyl radicals, $R_2$ is a member selected from the group consisting of lower fatty acid acyl radicals and mononuclear aryl carboxylic acid acyl radicals and $R_3$ is a member selected from the group consisting of hydrogen, lower fatty acid acyl radicals and mononuclear aryl carboxylic acid acyl radicals.

2. Compound having the formula

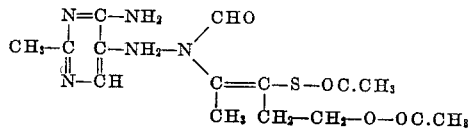

3. Compound having the formula

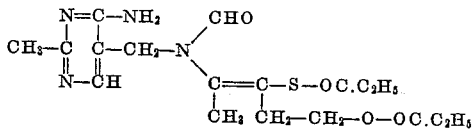

4. Compound having the formula

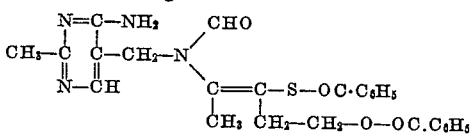

5. Compound having the formula

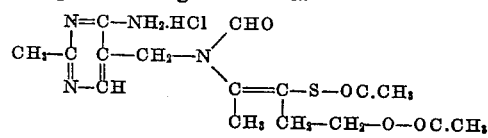

6. Compound having the formula

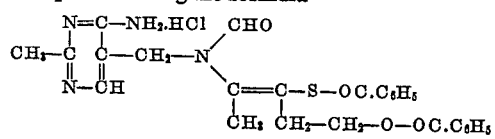

7. A process for preparing the compounds having the general formula

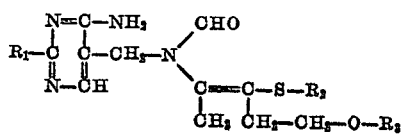

wherein $R_1$ represents a member selected from the group consisting of methyl and ethyl radicals, $R_2$ represents a member selected from the group consisting of lower fatty acid acyl radicals and mononuclear aryl carboxylic acid acyl radicals, and $R_3$ represents a member selected from the group consisting of hydrogen, lower fatty acid acyl radicals and mononuclear aryl carboxylic acid acyl radicals, which comprises reacting the compounds having the general formula

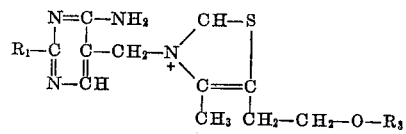

at nonacidic pH, with a member selected from the group consisting of carboxylic acid anhydrides and carboxylic acid halides.

8. A process for preparing the compounds having the general formula

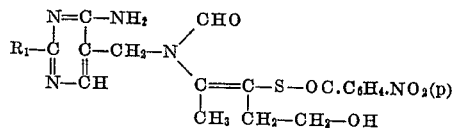

wherein $R_1$ represents a member selected from the group consisting of methyl and ethyl radicals, which comprises reacting the compounds having the general formula

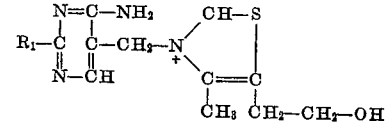

at nonacidic pH, with p-nitrobenzoyl chloride.

References Cited in the file of this patent

FOREIGN PATENTS 1,068,459   France _____ June 25, 1954